United States Patent [19]

Munro et al.

[11] Patent Number: 4,679,493

[45] Date of Patent: Jul. 14, 1987

[54] REINFORCED PISTONS

[75] Inventors: Robert Munro; Roger A. Day, both of Lymington, England

[73] Assignee: AE PLC, Warwickshire, England

[21] Appl. No.: 727,336

[22] Filed: Apr. 25, 1985

[30] Foreign Application Priority Data

May 1, 1984 [GB] United Kingdom ............... 8411074

[51] Int. Cl.[4] ............................................. F16J 1/01
[52] U.S. Cl. ...................................... 92/212; 92/213; 92/222; 92/224
[58] Field of Search ............... 92/248, 254, 228, 229, 92/218, 222, 241, 246, 212, 213, 211, 224

[56] References Cited

U.S. PATENT DOCUMENTS

| | | | |
|---|---|---|---|
| 3,149,409 | 9/1964 | Maruhn | 92/222 |
| 4,074,616 | 2/1978 | Gale et al. | 92/222 |
| 4,387,627 | 6/1983 | Avezou | 92/222 |
| 4,450,610 | 5/1984 | Schaper | 92/212 |
| 4,498,219 | 2/1985 | Ban et al. | 92/248 |
| 4,535,683 | 8/1985 | Dworak et al. | 92/222 |
| 4,548,126 | 10/1985 | Donomoto et al. | 92/213 |

FOREIGN PATENT DOCUMENTS 0001103 12/1979 United Kingdom ............... 92/211

Primary Examiner—Edward K. Look
Attorney, Agent, or Firm—Leydig, Voit & Mayer

[57] ABSTRACT

A reinforced piston is provided for an internal combustion engine. The uppermost piston ring groove is as close as possible to the crown of the piston. At least the lower surface of the groove is defined by an en-cast insert and overlying this is a portion of the crown reinforced by fibres, thus allowing this portion to be thin and the spacing between the ring groove and the upper surface of the crown to be minimized. The reinforced crown portion also holds the insert against axial separating movement. The crown can be provided with a combustion bowl whose entrance is reinforced by the fibres.

18 Claims, 4 Drawing Figures

REINFORCED PISTONS

BACKGROUND TO THE INVENTION

1. Field of the Invention

The invention relates to reinforced pistons for internal combustion engines.

In general, pistons for internal combustion engines are provided with a ring band which extends around a crown of the piston and in which are formed two or more piston ring grooves. A piston ring is provided in each groove and engages an associated cylinder or liner during operation of the engine. Since the piston rings are commonly made of a ferrous material and the piston is commonly made of a light metal or metal alloy such as aluminium or an aluminium alloy, it is customary to form at least one of the piston ring grooves (usually the uppermost) in a ferrous insert which is cast into, and surrounded by, the light alloy, in order to reduce piston ring groove wear.

There is, extending from above the uppermost piston ring to the level of the crown, a dead volume which is in communication with the combustion chamber formed above the piston. It has been found that, when this dead volume is reduced, there is a corresponding reduction in the exhaust emission and an improvement in the fuel consumption of the associated engine. One previous proposal for reducing this volume has been by a reduction in the clearance between the piston and the associated cylinder or liner. However, in highly rated engines, this can lead to a build-up of carbon in this volume, which causes bore polishing and can lead to high oil consumption.

2. Review of the Prior Art

In view of this, it has recently been proposed to reduce the dead volume by locating the uppermost piston ring as close as possible to the level of the crown. This involves moving the associated piston ring groove insert as high as possible up the piston, even to the extent of having the top of the piston ring groove insert flush with the top of the piston crown.

Although such a design reduces the dead volume to a minimum, it has a potentially very serious failure condition if the insert separates from the remainder of the piston. For this reason, such pistons require very careful handling and inspection to ensure that the connection between the insert and the remainder of the piston is maintained fully effective until the engine is operated. Although this reduces the possibility to a minimum, the potential dangers of separation of the piston and the insert are so great as to prevent widespread acceptance of this proposal, despite the attractions of a reduced dead volume. Even when the insert is overlaid by a thin layer of the light alloy, this potential failure condition still exists, because the strength of the light alloy may not be sufficient to maintain the insert in position.

SUMMARY OF THE INVENTION

According to the invention, there is provided a piston for an internal combustion engine formed of a light metal or metal alloy and comprising a crown, a ring band extending around the crown and including two or more piston ring grooves, each piston ring groove having upper and lower generally radially extending surfaces, the piston ring groove closest to the crown having at least the lower radially extending surface thereof formed by a wear-resistant insert which is cast into the piston, at least a portion of the crown including a fibre reinforcement which contacts the insert and which is between the insert and an upper surface of the crown, to allow the upper piston ring groove to be close to the upper surface of the crown.

BRIEF DESCRIPTION OF THE DRAWINGS

The following is a more detailed description of four embodiments of the invention, by way of example, reference being made to the accompanying drawings in which.

DESCRIPTION OF THE PREFERRED EMBODIMENTS

Figure 1:
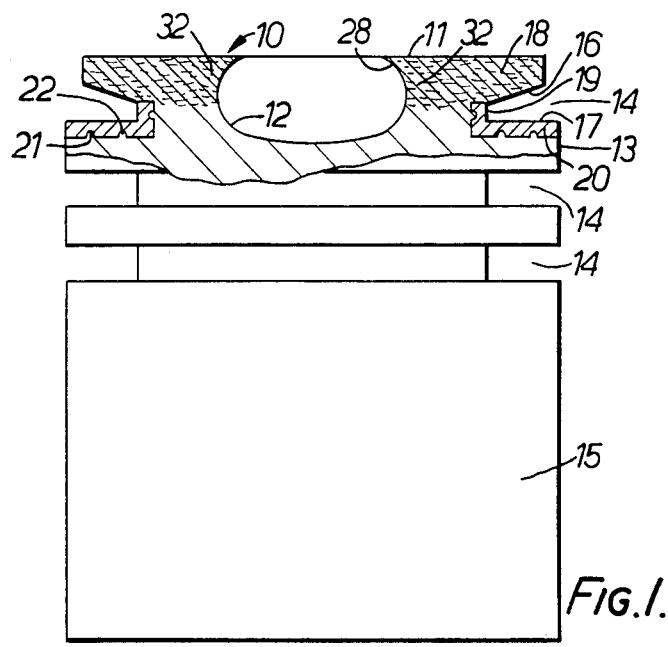
FIG. 1 is a side elevation of a piston for an internal combustion engine, the upper part of the piston being shown in section and including an insert and a reinforcement, the insert and the reinforcement forming between them a piston ring groove.

Referring first to FIG. 1, the piston has a crown 10 formed with an upper crown surface 11 and a combustion bowl 12. A ring band 13 extends around the crown and is formed with three piston ring grooves 14. Although three grooves 14 are shown, there may be two or four such grooves. A skirt 15 depends from the ring band.

The piston is cast from a light metal, such as aluminum or an aluminum alloy, in a manner to be described in more detail below.

The uppermost piston ring groove 14 has upper and lower generally radially extending surfaces 16, 17 respectively. The upper radially extending surface 16 is formed by a portion 18 of the crown which is reinforced with fibres. This fibre reinforced portion 18 is generally annular and extends around the periphery of the crown to form an outer part of the upper surface 11 of the crown and the commencement of the ring band 13. The fibres act to strengthen these parts and render them more resistant to the high temperatures encountered by the crown in operation.

The lower radially extending surface 17 of the upper piston ring groove 14, together with a base 19 extending between the upper and lower radially extending surfaces 16, 17 is defined by an insert 20 of a ferrous material, such as cast iron or steel or NI-RESIST (Trade Mark). This insert 20 is in the form of a generally flat ring with an upstanding inner edge. The upper surface of the ring forms the lower radially extending surface 17 of the groove 14 while the outer surface of the edge forms the base 19 of the groove 14.

The lower surface of the ring and the inner surface of the edge are formed with shallow recesses 21 which interlock with corresponding projections 22 formed by the light metal of the piston. In the embodiment shown in FIG. 1, the recesses 21 extend circumferentially around these surfaces with the recess 21 on the edge tending to resist movement of the insert 20 in a direction parallel to the axis of the piston and the recesses 21 on the lower surface of the ring tending to prevent radial movement of the insert 20.

The free end of the edge of the insert 20 contacts the reinforced portion 18 so that the reinforced portion 18 further prevents the insert separating from the remainder of the piston in an axial direction. Because this part of the piston is reinforced, and so strengthened, the axial thickness can be kept to a minimum, so allowing the upper piston ring groove 14 to be as close as possible to the crown surface 11, so reducing to a minimum the dead volume above a piston ring in the uppermost groove 14, i.e. the annular volume around the piston between the upper surface of such a piston ring and the level of the piston crown.

The piston of FIG. 1 can be manufactured in any convenient way. For example, a suitably shaped wad or mat of fibres, such as alumina fibres, may be placed with an annular ferrous insert 20 of generally rectangular cross-section at the base of a mould. Molten aluminium or aluminium alloy is then gravity fed into the mould and a suitably shaped upper mould part brought into the lower mould part to close the die and to apply a force of many tons to the solidifying metal. This forces the molten aluminium or aluminium alloy into the wad or mat of fibres and also into the recesses in the insert 20, so ensuring that the fibres and the insert 20 are fully incorporated into the casting so produced.

The insert 20 may be provided with a bond metal coating to improve bonding between the insert 20 and the aluminium or aluminium alloy. In this case, the wad or mat of fibres may be pre-heated to keep the bond metal on the insert 20 molten, so facilitating good bond pick-up during the casting of the aluminium or aluminium alloy.

The piston ring grooves 14 are then machined in the casting by any suitable machining technique. One beneficial effect of this, in relation to the uppermost groove 14, arises as follows. When a ferrous insert 20, particularly one of cast iron, is encast, it is desirable that all the molten metal contacting surfaces are adequately washed by the molten metal during casting to remove impurities. When a piston is cast 'crown-down', as described above, it is difficult to ensure adequate washing of the upper radially extending surface of the insert (which, in crown-down casting, is the lower of the two radially extending surfaces). The method described above, overcomes this problem because the machining step cuts away both the upper radially extending surface and the adjacent fibres or whiskers, so removing any imperfections in this region.

Alternatively, the reinforced crown portion of the piston may be formed separately from the remainder of the piston by a squeeze casting process, such as that described above and then the reinforced portion incorporated into the piston with the insert.

Figure 2:
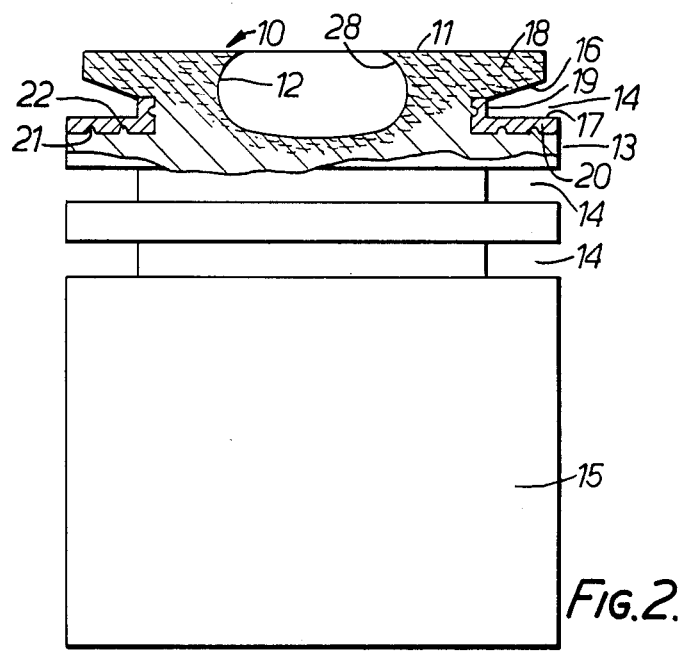
FIG. 2 is a view similar to FIG. 1 but in which the reinforcement extends across the whole of the crown of the piston to reinforce a combustion bowl of the piston.

Referring next to FIG. 2, parts common to FIGS. 1 and 2 are given the same reference numerals and are not described in detail. In the embodiment of FIG. 2, the reinforced crown portion 18 extends over the whole of the crown of the piston 10 and, at the centre of the piston, is of such a thickness that the combustion bowl 12 is formed wholly within the reinforced crown portion 18. Thus, the combustion bowl entrance 28, which, being thin is particularly susceptible to damage at elevated operating temperatures, is reinforced and is better able to withstand such elevated temperatures.

Alternatively, as shown in broken line at 32 in FIG. 1, the reinforced crown portion 18 may extend to the combustion bowl entrance 28 but not reinforce the base of the combustion bowl. In this way, the combustion bowl entrance 28 which is the part of the combustion bowl most susceptible to heat damage, is reinforced.

Figure 3:
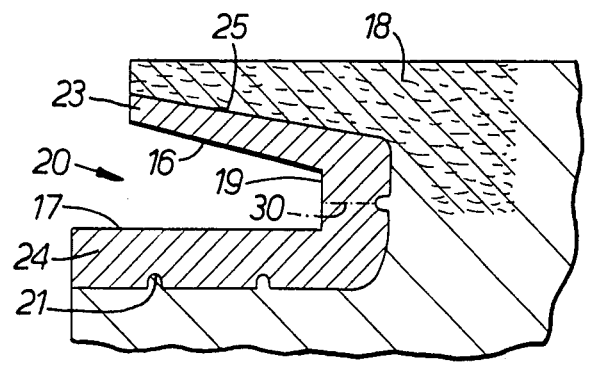
FIG. 3 is a cross-section of a part of a first variation of the piston of FIG. 1 in which the piston ring groove is formed wholly within the insert, with the reinforcement holding the insert in position.
Figure 4:
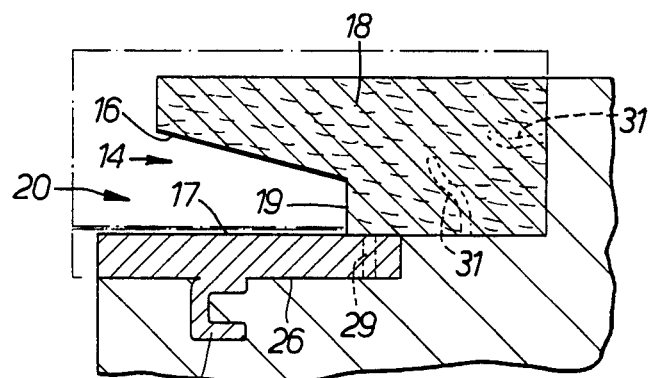
FIG. 4 is a cross-section of a part of a second variation of the piston of FIG. 1 in which the reinforcement has a generally flat surface which defines a lower surface of the piston ring groove.

Referring next to FIGS. 3 and 4, these Figures show alternative ways of forming the upper piston ring groove 14, parts common to FIG. 1 and to FIGS. 2 and 3 being given the same reference numerals and not being described in detail. In addition, since the pistons of FIGS. 2 and 3 can be manufactured in any of the ways described above with reference to FIG. 1, the complete manufacture of the pistons of FIGS. 2 and 3 will not be described in detail.

In FIG. 3, the insert 20 is generally annular with upper and lower limbs 23, 24 which define the upper and lower radially extending surfaces 16,17. These limbs 23, 24 are interconnected at their radially inner ends to form the base 19. The outer surface of the insert 20 is provided with recesses 21 which interlock with projections formed by the remainder of the piston, in the manner described above with reference to FIG. 1.

The fibre reinforced portion 18 of the piston is shaped so that it overlies an upper surface 25 of the upper limb 23 of the insert, so holding the insert 20 on the piston and also protecting it from the elevated temperatures encountered in operation.

Although a single insert 20 is shown in FIG. 3, it will be appreciated that this insert may be formed in two parts, separated at the line 30 in FIG. 3.

Referring next to FIG. 4, in this embodiment the insert 20 is in the shape of a flat ring. An upper surface of the ring forms the lower radially extending surface 17 of the piston ring groove 14. A lower surface 26 of the insert 20 carries an annular connecting member 27 which includes a plurality of apertures therethrough. The material of the remainder of the piston extends through these apertures to lock the insert 20 to the piston body.

The reinforcement 18 is shaped to define the upper radially extending surface of the groove 14 and also the base 19 of the groove 14. The inner end of the ring-like insert 20 extends into the remainder of the piston and its upper surface is contacted by the reinforcement 18 so that the reinforcement holds the insert against axial movement.

As has been described above, the reinforced crown portion 18 of the piston can be manufactured separately from the remainder of the piston and then incorporated into the piston. One example of such manufacture will now be described with reference to FIG. 4.

The reinforced crown portion 18 is cast, for example squeeze cast, separately from reinforcing fibres, such as alumina fibres sold under the trade mark SAFFIL, and a hyper-eutectic aluminium-silicon alloy, with the optional addition of graphite. After casting the reinforced crown portion 18 is pre-machined to a generally rectangular cross-section, as shown in chain-dotted line in FIG. 4, i.e. oversize for its required final shape.

The pre-machined reinforced crown portion 18 is then encast into the piston, for example, by a squeeze casting process. To ensure attachment of the portion to the cast piston material, the portion 18 may be provided with passages 31 extending therethrough into which the piston material passes to form an interlock. Additionally, or alternatively, the reinforced crown portion 18 may be plated with copper to facilitate the interconnection on casting. Additionally or alternatively, a labyrinth can be incorporated at the edges of the crown portion 18 so that this can readily fuse in the molten casting metal, thus giving a good bond.

As shown in FIG. 4 in broken line, the insert 20 is also manufactured over-size and is incorporated into the piston in this condition. The insert 20 may be provided with apertures 29 into which the piston material penetrates on casting to improve the interlock between the insert 20 and the piston body.

After casting, the complete piston is finish-machined to the shape shown in full line in FIG. 4. Thus the depth and diameter of the reinforced crown portion 18 are reduced and the piston ring groove 14 is formed in this portion 18. At the same time, the outer edge of the insert is machined flush with the piston surface and the upper surface 17 of the insert 20 is also machined away to provide a flat groove surface.

In all the embodiments described above with reference to the drawings, the reinforced portion of the piston is generally annular in shape. It will be appreciated, however, that this need not necessarily be the case. The reinforcement may have any convenient shape and may contact a greater proportion of the surface of the insert, than the reinforcement of FIGS. 1 to 3.

Although the inserts 20 described above with reference to FIGS. 1 and 2 are provided with circumferentially extending recesses, it will be appreciated that these recesses may be arranged in any convenient manner. For example, they might be arranged in the form of an intersecting grid or network of recesses with one set of recesses extending circumferentially and another set of recesses extending radially and axially. For example, the recesses and projections may be arranged in any of the ways described in British Patent Specification No. 2,104,622.

Although recesses and connecting members have been described above for connecting the inserts to the remainder of the piston, it will be appreciated that this connection may be formed in any suitable way either in addition to or as an alternative to the recesses and connecting members. For example, the so-called 'Al-Fin' bond may be used. Alternatively, there may be provided welds or other forms of metallurgical connection between the insert and the remainder of the piston. In the embodiments of FIGS. 1, 2 and 3, the connection may be omitted.

We claim:

1. A piston for an internal combustion engine formed of a light metal or metal alloy and comprising:
   a crown having an upper surface,
   a ring band extending around the crown and including at leat two piston ring grooves,
   each of said at least two piston ring grooves having upper and lower generally radially extending surfaces,
   one of said piston ring grooves being closely adjacent said crown and having at least the lower radially extending surface thereof formed by a wear-resistant insert which is cast into the piston,
   at least a portion of the crown including a fibre reinforcement which contacts the insert and which is between the insert and an upper surface of the crown said at least a portion of the crown being of minimum axial thickness, to prevent the separation of said insert from the crown in an axial direction while allowing the upper piston ring groove to be close to the upper surface of the crown.

2. A piston according to claim 1, wherein the upper radially extending surface of the upper piston ring groove is formed by the fibre reinforced portion of the crown.

3. A piston according to claim 2, wherein a base connects the radially inner ends of the upper and lower radially extending surfaces, and wherein the base is formed by the insert.

4. A piston according to claim 2, wherein a base connects the radially inner ends of the upper and lower radially extending surfaces, and wherein the base is formed by the reinforced portion.

5. A piston according to claim 2, wherein the insert has a radially inner end located within the remainder of the piston, the fibre reinforced portion contacting the inner end.

6. A piston according to claim 1, wherein the upper radially extending surface of the upper piston ring groove is formed by the insert.

7. A piston according to claim 6, wherein the insert is formed in two parts, one part forming the lower radially extending surface and the other part forming the upper radially extending surface.

8. A piston according to claim 6, wherein the insert is cast from a ferrous material and has upper and lower limbs which define respectively the upper and lower radially extending surfaces, there being a base connecting said limbs.

9. A piston according to claim 8, wherein the reinforced portion of the piston contacts the outer surface of the upper limb.

10. A piston according to claim 1, wherein the insert and the surrounding material form an interlocking projection and recess to prevent separation of the insert in a direction normal to the piston axis.

11. A piston according to claim 10, wherein the insert and the surrounding material form at least one further interlocking projection and recess to prevent separation of the insert in a radial direction.

12. A piston according to claim 11, wherein the insert is provided with a mesh or grid of intersecting recesses which engage with corresponding projections formed by the surrounding material.

13. A piston according to claim 10, wherein the insert has a plurality of apertures therethrough, the material of the remainder of the piston extending into said apertures to lock the insert to the piston body.

14. A piston according to claim 1, wherein the fibre reinforced portion of the crown is an annular portion extending around the periphery of the crown.

15. A piston according to claim 1, wherein the fibre reinforced portion of the crown extends across the whole of the crown.

16. A piston according to claim 15, wherein the piston includes a combustion bowl having an entrance extending therearound and wherein the fibre reinforced portion forms at least said combustion bowl entrance.

17. A piston according to claim 1, wherein the fibre reinforced portion of the piston is formed separately from the remainder of the piston, wherein the piston is formed by casting, and wherein the fibre reinforced portion is incorporated during said casting of the piston.

18. A piston according to claim 1, wherein the piston is formed by placing a wad or mat of reinforcing fibres in a casting mould, together with the insert, and then casting the piston around the insert and into the fibre reinforcement by a squeeze casting process.

* * * * *